US012711144B2

(12) United States Patent
Podkowa

(10) Patent No.: US 12,711,144 B2
(45) Date of Patent: Aug. 18, 2026

(54) HYBRID DATA ANALYTICS IN ON-PREMISE AND CLOUD COMPUTING ENVIRONMENTS

(71) Applicant: State Farm Mutual Automobile Insurance Company, Bloomington, IL (US)

(72) Inventor: Elizabeth Holly Podkowa, Savoy, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 18/949,050

(22) Filed: Nov. 15, 2024

(65) Prior Publication Data

US 2025/0165487 A1 May 22, 2025

Related U.S. Application Data

(60) Provisional application No. 63/602,172, filed on Nov. 22, 2023.

(51) Int. Cl.
*G06F 16/248* (2019.01)
*G06F 16/2455* (2019.01)

(52) U.S. Cl.
CPC ...... *G06F 16/248* (2019.01); *G06F 16/24552* (2019.01)

(58) Field of Classification Search
CPC ......................... G06F 16/248; G06F 16/24552
USPC ................................ 707/722, 759, 760, 769
See application file for complete search history.

(56) References Cited

U.S. PATENT DOCUMENTS

2007/0299834 A1* 12/2007 Liu ..................... G06F 16/8365 707/999.004
2013/0254177 A1* 9/2013 Davlos ................ G06F 16/9532 707/706
2017/0371750 A1* 12/2017 Horowitz .............. G06F 16/904
2022/0335046 A1* 10/2022 Oshio ..................... G06F 16/93
2023/0130267 A1* 4/2023 Mukherjee .......... G06F 16/2448 707/760
2024/0143612 A1* 5/2024 Bigdelu .............. G06F 16/2425

* cited by examiner

*Primary Examiner* — Phong H Nguyen
(74) *Attorney, Agent, or Firm* — Lee & Hayes, P.C.

(57) ABSTRACT

Techniques described herein relate to performing hybrid data analytics, including generating and training data queries and/or taxonomies using on-premise data analytics tools, modifying the queries, and then executing the modified queries within a cloud computing environment using a query execution platform on the cloud environment. A query transformer may be used to modify the queries (e.g., NLP or text analytics queries) using operation mapping, fine-tuning, and/or search and replace listings, into modified queries compatible with the native data analytics functionalities of the cloud environment. An initial one-time data retrieval may be performed from the cloud computing environment to allow the queries to be generated and trained effectively using the on-premise tools and based on the organization's data. After transforming and validating the modified queries, these queries may be deployed within the cloud environment, and executed using a query execution platform implementing specially-designed functions built on the native cloud tools to execute the modified queries on organization's data within the cloud environment.

20 Claims, 7 Drawing Sheets

Natural Language Query Request:

402

Find data record with non-negated occurrences of terms "rain" or "wet" and do not include an indication of if the rain was heavy or light.

Simple String Query:

404

("rain" or "wet") AND NOT ("heavy" or "heavily" or "light" or "lightly")

Validated Query For On-Premises Data Analytics Tool:

406

1 possible (rain or wet) AND
2 NOT dependency (rain, heavy or heavily or light or lightly)

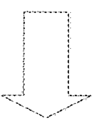

QUERY TRANSFORMER 110

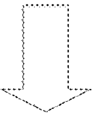

Modified Query For Query Execution Platform:

408

```
rain_wet = transformer.possible ([["rain","wet"]])
heavy_light=transformer.dependency ([["rain"],["heavy",
"heavily", "light", "lightly"]])

rain3=transformer.AND_outputs([rain_wet, transformer.NOT
(heavy_light)])
```

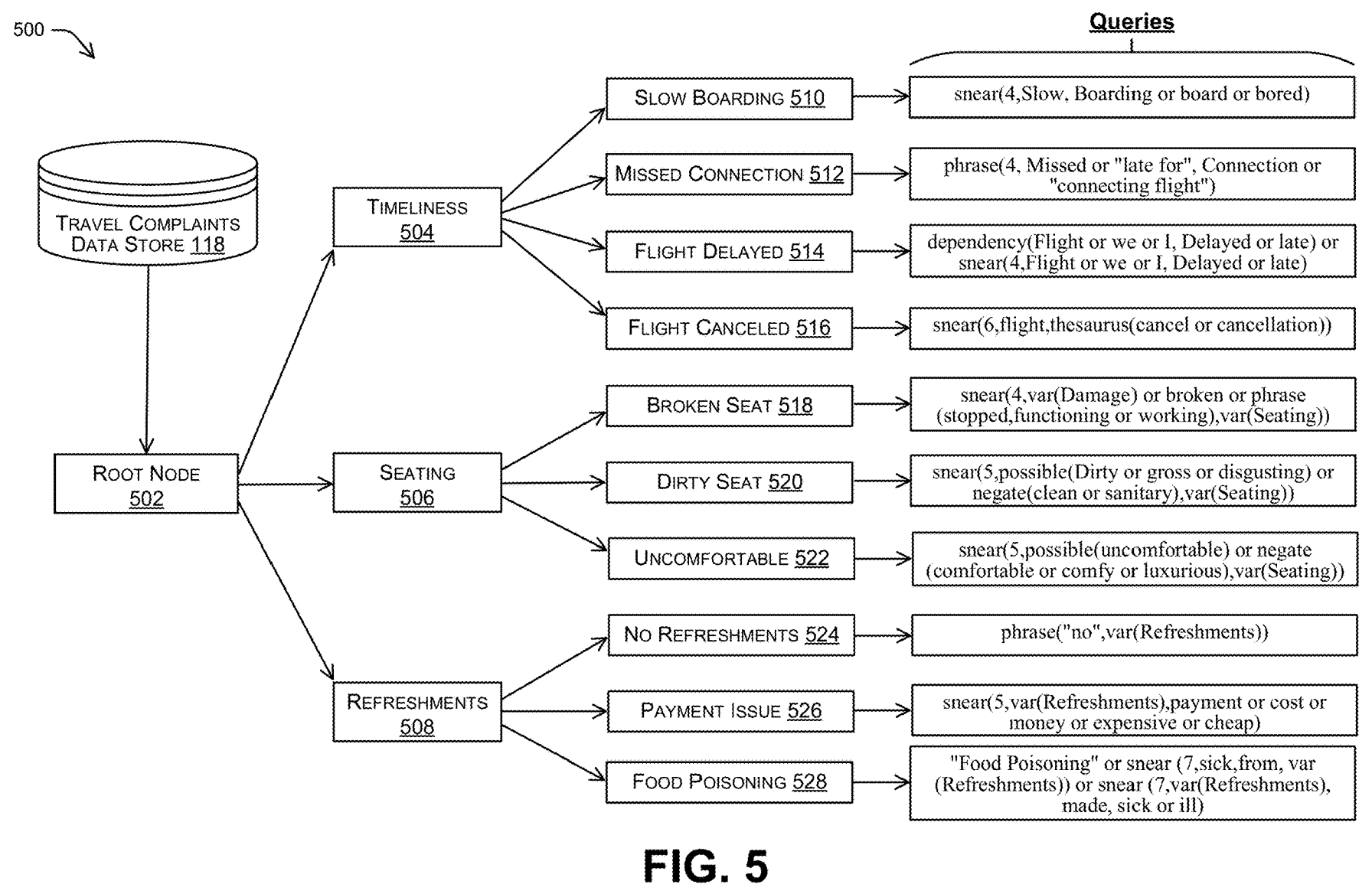

Travel Complaints Data Store 118

Root Node 502

Timeliness 504

Seating 506

Refreshments 508

Slow Boarding 510

Missed Connection 512

Flight Delayed 514

Flight Canceled 516

Broken Seat 518

Dirty Seat 520

Uncomfortable 522

No Refreshments 524

Payment Issue 526

Food Poisoning 528

Queries snear(4,Slow, Boarding or board or bored)

phrase(4, Missed or "late for", Connection or "connecting flight")

dependency(Flight or we or I, Delayed or late) or snear(4,Flight or we or I, Delayed or late)

snear(6,flight,thesaurus(cancel or cancellation))

snear(4,var(Damage) or broken or phrase (stopped,functioning or working),var(Seating))

snear(5,possible(Dirty or gross or disgusting) or negate(clean or sanitary),var(Seating))

snear(5,possible(uncomfortable) or negate (comfortable or comfy or luxurious),var(Seating))

phrase("no",var(Refreshments))

snear(5,var(Refreshments),payment or cost or money or expensive or cheap)

"Food Poisoning" or snear (7,sick,from, var (Refreshments)) or snear (7,var(Refreshments), made, sick or ill)

FIG. 5

HYBRID DATA ANALYTICS IN ON-PREMISE AND CLOUD COMPUTING ENVIRONMENTS

CROSS-REFERENCE TO RELATED APPLICATIONS

This application is a non-provisional of and claims priority to U.S. Provisional Patent Application No. 63/602,172, filed on Nov. 22, 2023, and entitled "HYBRID DATA ANALYTICS IN ON-PREMISE AND CLOUD COMPUTING ENVIRONMENTS," the disclosure of which is incorporated herein by reference in its entirety for all purposes.

BACKGROUND

Cloud computing environments and other large-scale computing infrastructures can be used to store and maintain data, execute services, and perform various other computing functionality. For example, certain organizations may use cloud computing environments provided by one or more cloud providers to store the organization's data and/or to deploy cloud services configured to monitor, analyze, and execute automated processes on the data. Cloud-based data storage and cloud service deployments may provide a number of advantages for organizations, including improved flexibility, scalability, access mobility, and disaster recovery capabilities. To deploy and manage software within cloud computing environments, an organization may rely on a cloud provider to deploy and maintain its cloud-based services, store its data repositories, and provide various other computing resources via remote cloud servers, including computing infrastructure applications, network functionality, and data resources. Cloud services may include, but are not limited to, Software-as-a-Service (SaaS), Infrastructure-as-a-Service (IaaS), and Platform-as-as-Service (PaaS), which may be delivered via public, private, and/or hybrid cloud implementations.

In addition to, or as an alternative to cloud-based storage and service deployments, organizations may store their data and implement various applications and services using on-premise computing infrastructures (e.g., datacenters) maintained by the organization. In some instances, on-premise computing infrastructures may provide advantages for an organization over cloud-based deployments when implementing certain computing functionality. Advantages of on-premise infrastructures may include, in various instances, cost savings, data security, service accessibility and flexibility, etc. In some instances, an organization may implement a hybrid computing environment, in which one or more on-premise datacenters are used to provide software development and testing environments, after which the executable services may be uploaded and deployed within separate cloud computing environments.

For example, organizations often use a combination of cloud and on-premise computing environments for developing and executing data analytics tasks. Data analytics may include a wide variety of automated techniques relating to data retrieval, analysis, and/or manipulation. Data analytics techniques may include, for example, detecting patterns or trend analysis in data, and/or other automated analysis to draw conclusions based on an organization's data. Additional data analytics techniques can include natural language processing (NLP), text analytics, data mining, predictive analysis, event processing, and the like.

Implementing systems to perform large-scale data analytics tasks, such as natural language processing (NLP), text analytics, and the like, may present a number of technical challenges. In such systems, the organization data to be analyzed may be stored in cloud-based data stores or repositories, while the data analytics tools used to develop and execute the data analytics may be on-premise tools within on-premise development environments. For example, to perform an NLP or text analytics task, a developer may use on-premise data analytics tools to generate and validate individual queries, or taxonomies of queries, to be applied to the organization's data. However, the organization's data may reside in one or more separate cloud computing environments, which might not support the queries generated using the on-premise data analytics tools.

To address the technical challenges in developing and executing data analytics on cloud data repositories, certain systems use native text tools and/or packages within the cloud computing environment, rather than on-premise data analytics tools, to generate the taxonomies/queries to be used for the data analytics. For example, in cloud environments from various cloud providers, such as Amazon Web Services (AWS®), Microsoft Azure®, Google Cloud®, etc., the cloud environment may include native NLP tools designed to perform specific text-related tasks, such as sentiment analysis and/or unsupervised topic modeling. Additionally, certain cloud environments may include software libraries and/or packages (e.g., Python packages) that support specific functionality on text data, such as proximity text searches. However, in many cloud environments, the existing tools and/or packages may be unable to perform queries or taxonomies on text data, or may be unable to perform more complex query functions, such as searches based on dependency parsing.

Further, existing cloud-based tools (e.g., NLP tools) and/or packages providing limited functionality in certain cloud environments also may be more difficult for developers to work with. For instance, the native NLP tools in a cloud environment may support fewer NLP operators, may provide no user interface (or a limited user interface), and fewer useful development features such as spellcheckers, query visualization and validation features, etc. Moreover, the native NLP tools within a cloud environment may present difficulties for users that are used to the on-premise development environment of the organization, and may require additional time-consuming steps to access the tools in the cloud-based environment, train, test, and validate queries, etc.

In other systems, organizations may address the technical challenges of developing and executing data analytics by retrieving batches of data records from the cloud data storage environments onto the on-premise datacenter to execute the analytics. For example, an automated process may retrieve batches of data records periodically from a cloud storage environment, and then execute the queries/taxonomies developed using on-premise data analytics tools, and within the on-premise datacenter environment. While these solutions may allow developers to generate and train queries using preferred on-premise data analytics tools, they also may result in significant additional cloud access costs, network usage costs, and/or delays, caused by repeatedly retrieving large amounts of organization data from the cloud environment.

SUMMARY

To address these and other problems and inefficiencies, this disclosure describes systems and techniques for performing hybrid data analytics, in which data queries and taxonomies can be generated and trained using on-premise data analytics tools, and executed within separate cloud computing environments. In various examples, a query transformer system may be used to transform queries (e.g., NLP or text analytics queries) generated using on-premise data analytics tools, into modified queries within a query execution platform on the cloud computing environment. The query execution platform may be a cloud-based programming platform including a package of functions configured to support the transformation, execution, and evaluation of modified queries/taxonomies. The functions within the query executor of the query execution platform may use the native cloud-based tools and functionalities (e.g., text tools, NLP tools, Python packages, etc.) of the cloud computing environment.

To generate the queries, individually or as a taxonomy of queries, the system may initially perform a one-time retrieval of organization data from the cloud computing environment of the organization to the on-premise datacenter infrastructure. In various examples herein, a "taxonomy" may refer to a hierarchical structure of queries. Some use cases may require that each observation (e.g., text data such as a claim file note, freeform survey response, etc.) appear only once in the taxonomy, while others may allow for an observation to appear multiple times in the same taxonomy. Users can generate data analytics queries using their preferred on-premise data analytics tools, and those queries can be trained and validated based on the organization data retrieved from the cloud computing environment. After the queries have been generated, trained, and validated using the on-premise data analytics tools and the on-premise development environment, the validated queries may be transmitted to the query execution platform within the cloud environment. Within the query execution platform, a query transformer may be used to transform the queries into modified queries that are supported by the query execution platform, using specially-designed functions that leverage the native tools and packages on the cloud environment to execute the modified queries. Thus, the modified queries can be executed within the cloud computing environment and used to perform data analytics on an organization's data directly within the cloud environment.

As described herein, the query transformer may be configured to map the operations from the original queries generated using on-premise data analytics tools, into corresponding operations supported by the query execution platform that can be executed in the native cloud environment. The mappings can be one-to-one mappings and/or one-to-many mappings between the operations (or functions) of the on-premise data analytics tool and the operations (or functions) supported by the query execution platform in the cloud computing environment. As described below, the query execution platform may use the native tools and packages (e.g., Python packages) on the cloud environment to implement the specially-designed functions of the query execution platform. In some examples, the query execution platform also may implement supplemental query operations and/or may perform evaluation and fine-tuning, so that the modified queries executed in the cloud environment produce results similar or identical to the results of the original queries executed in the on-premise environment.

In some examples, the query execution platform described herein may include functionality to evaluate the modified queries as producing similar (or identical) results to the results of the original queries. For instance, after transforming a query into a modified query, the query execution platform may use a query evaluator to compare the output of the original query executed using the on-premise data analytics tool against a training data set, and the modified query executed within the query execution platform against the same training data set. For example, a query evaluator component may compare the execution results of a modified query to a data column containing results from an on-premise data analytics tool and/or a manually labeled ground truth. An automated comparison and/or manual verification may be used to validate that the results of the modified query (executed using the query execution platform in the cloud environment) are identical to or within a similarity threshold of the results of the original query (executed using the on-premise data analytics tool within the on-premise environment). Alternatively, when a validated query cannot be transformed (e.g., when the query includes operations that are not supported and do not have corresponding alternatives supported by the cloud-based query execution platform), or when the modified query outputs results that are significantly different from the results of the original query, then the modified query might not be used by the query transformer. In such cases, the query transformer may generate a different modified query (e.g., using different operation mappings, fine-tuning, search-and-replace, etc.), to attempt to generate an improved modified query that more closely approximates the original query. Thus, in various examples, the query transformer may be configured to expressly transform one NLP query syntax into another.

In some examples, the query execution platform also may approximate the term replacement functionality (and/or spelling corrector functionality) within the on-premise data analytics tool used to generate the query. For instance, while generating a query using the on-premise data analytics tool, the tool may save the term replacement results applied during the query training process. The query execution platform may use the term replacement results to determine a search-and-replace listing of terms which can be implemented within the modified query using the text search and replace operations supported by the query execution platform.

As illustrated by the features and examples in this disclosure, the techniques herein provide technical advantages for performing data analytics operations on data within cloud-based data stores. For example, the native tools and/or packages in a cloud computing environment may support a reduced or limited set of NLP and/or text operations as compared with the more robust on-premise data analytics tools. However, the techniques described herein may include using a query transformer system to generate modified queries that can be executed by a query execution component within a cloud computing environment, which can accurately approximate the results of the original queries generated and trained using the on-premise data analytics tools. As noted above, many existing tools and/or packages may be unable to perform complex query functions including searches based on dependency parsing. For instance, certain existing tools might provide a dependency function that only considers a term directly syntactically dependent. In contrast, the query executor described herein may consider, as a dependency function, the entire syntactic branch.

Further, the techniques described herein may provide improvements in performance and usability of data analytics, over solutions where NLP queries and/or taxonomies are generated and trained using the native cloud-based tools (e.g., native NLP tools, native text tools, packages and/or libraries, etc.) within the cloud computing environment. As noted above, certain cloud-based NLP and/or text analytics tools may have limited functionality, such as a reduced set of query operations and a lack of features such as user interfaces, term replacement/spelling correctors, etc. As a result, complex or robust NLP queries may be more difficult to generate and train using native cloud-based tools, and such queries may be error-prone and less valuable to the organization during execution. In contrast, the techniques herein provide improvements by allowing NLP and text analytics queries to be generated using the preferred on-premise data analytics tools, and trained using authentic organization data. The result is that the queries generated and trained using these techniques may be robust and highly accurate queries that provide improved data analytics for the organization.

Additionally, after the queries generated using the preferred on-premise tools and development environment have been transformed into modified queries, they can be executed via a query execution platform configured with specially-designed functions to execute the modified queries in the cloud environment, where the specially-designed functions may be implemented using the underlying native data tools and packages on the cloud environment. In contrast to systems that require repeated transfers of data from the cloud data storage to execute NLP or text analytics queries, these techniques allow the modified queries to be executed within the cloud-based environment any number of times without requiring additional data transfers and additional cloud access operations.

BRIEF DESCRIPTION OF THE DRAWINGS

FIG. 4 depicts an example transformation of a query from a validated query for an on-premise data analytics tool into a modified query for use by a cloud-based query execution platform, in accordance with one or more examples of the present disclosure.

FIG. 5 depicts an example query taxonomy, in accordance with one or more examples of the present disclosure.

DETAILED DESCRIPTION

Figure 1:
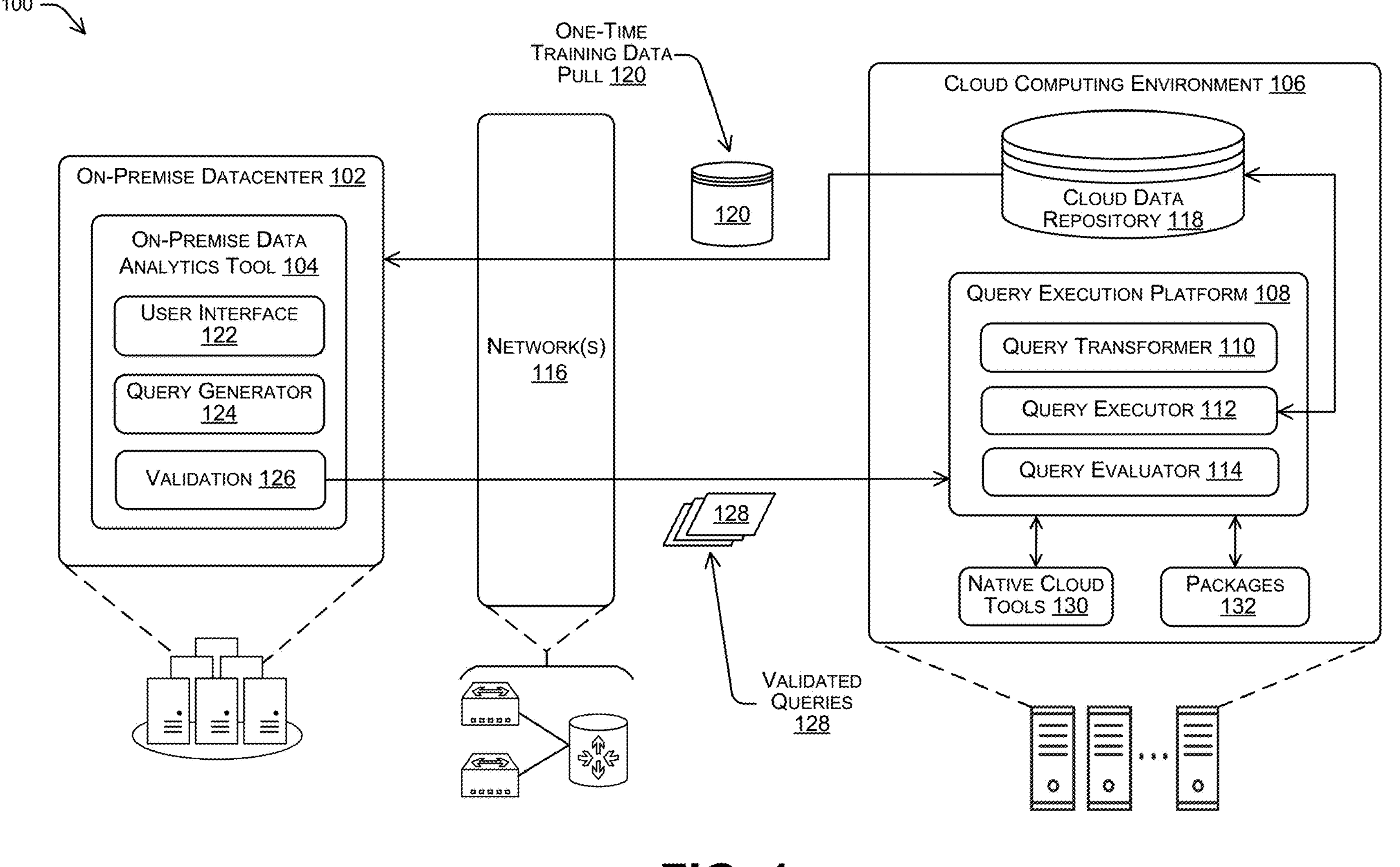
FIG. 1 depicts an example computing environment configured to generate and execute data analytics queries to perform data analytics tasks for an organization, including an on-premise datacenter and separate a cloud computing environment, in accordance with one or more examples of the present disclosure.

FIG. 1 illustrates an example computing environment 100 associated with an organization, including components configured to generate natural language processing (NLP) queries, and execute the queries to perform various data analytics tasks on the organization's cloud data stores. As shown in this example, the computing environment 100 may include an on-premise datacenter 102 (or on-premise computing infrastructure) including an on-premise data analytics tool 104 for generating and/or training data analytics queries (and/or taxonomies of multiple queries). Within a separate cloud computing environment 106, a query execution platform 108 may include functionality to transform (or modify) the queries generated via the on-premise data analytics tool 104, and to execute and evaluate the modified queries within the cloud computing environment 106. In various examples, the transformation of the queries (using the query transformer component 110), the execution of the queries (using the query executor component 112), and the evaluation of the queries (using the query evaluation component 114), may be implemented as separate functions within the query execution platform 108. The query execution platform 108 may be implemented as a software package (e.g., a Python package) of functions, any or all of which may leverage additional native cloud tools (e.g., native text tools, NLP tools, packages, libraries, etc.) supported by the cloud computing environment 106.

The computing environment 100 may be referred to herein as a hybrid environment, in that it includes multiple separate computing infrastructures (e.g., one or more on-premise datacenters and/or cloud environments) which are separated by communication networks. In this example, the on-premise datacenter 102 and the separate cloud computing environment 106 may be implemented as separate domains of computing resources, including different computing hardware infrastructures, different networks, and/or at different geographic locations. Separate computing infrastructures also may be separated by one or more network components, including wide-area network (WAN) and/or core network nodes, firewalls, authentication nodes, etc.

In this example, the on-premise datacenter 102 may include a datacenter of an organization built within a secure internal network. The on-premise data analytics tool 104 can include any number of software platforms and/or development environments to allow users of the organization to generate and train (e.g., test and evaluate) data analytics. For example, the on-premise data analytics tool 104 may correspond to one or more software platforms and tools such as PolyAnalyst® by Megaputer Intelligence, Base SAS®, Anaconda Enterprise®, or Watson Studio® by IBM, etc. Additionally, although some examples herein may refer to on-premise data analytics tool 104 as being used to generate NLP queries, in other examples the on-premise data analytics tool 104 can be a tool designed to allow users to design, build, test, and train various different executable software for data analytics. For instance, in addition to or as an alternative to generating NLP queries, the on-premise data analytics tool 104 may be used to generate text analytics/text mining executables, speech recognition programs, sentiment analysis programs, etc.

The query execution platform 108 in this example may be a cloud-based programming platform that includes a set of specially-designed functions for transforming, executing, and evaluating queries. For example, any or all of the query transformer component 110, the query executor component 112, and/or query evaluation component 114, may include functions that invoke native cloud tools 130 and/or packages 132 within the cloud computing environment 106. The query executor component 112 may implement and support a set of query functions that can be used to execute the modified queries (and/or taxonomies) generated by the query transformer component 110. The query functions supported by the query executor component 112 may be similar or identical to the query functions supported by the on-premise data analytics tool 104. However, in some cases, the query executor component 112 may support different sets of query functions and/or different functionality from that of the on-premise data analytics tool 104. Thus, the queries generated and trained using the on-premise data analytics tool 104 may be incompatible with and cannot be executed on the query execution platform 108, and vice versa. In some cases, the query executor component 112 might support a reduced set of query functions as compared to the query functions supported by the on-premise data analytics tool 104. Additionally, the query execution platform 108 might not provide a robust (or any) development environment or user interface, and/or might not provide capabilities for generating, testing, and/or training NLP queries or other data analytics executables. In some cases, the query execution platform 108 may be implemented as a package of functions that can run in a native programming language of the cloud environment (e.g., Python®, R®, NodeJS®, PHP®, etc.). As shown in this example, the functions of the query execution platform 108 may invoke (e.g., via APIs) additional cloud-based resources, such as native cloud tools 130 (e.g., native text tools, native NLP tools, etc.) and/or packages 132 (e.g., Python packages or other libraries) within the cloud computing environment 106. Thus, unlike the on-premise data analytics tool 104, the query execution platform 108 might not have a robust user interface, term replacement features, robust training and validation features for NLP queries, etc.

As discussed above, the computing environment 100 described herein and other similar computing environments may be used to generate NLP queries (and/or other data analytics software) within a first computing infrastructure (e.g., network or resource domain), and then transform the NLP queries for execution within a different second computing infrastructure. As described herein, a computing environment may include, for example, any type of cloud computing infrastructure (e.g., a public or private cloud environment, a hybrid cloud environment, etc.), an on-premise datacenter implemented using a private organization computing infrastructure, and/or various other computing resource domains/infrastructures that use separate or dedicated sets of computing resources.

In some examples, the components within the on-premise datacenter (or computing infrastructure) 102 and the cloud computing may communicate via one or more networks 116. Networks 116 may include one or more access networks and/or core networks. The networks 116 may communicatively couple some or all of the components shown in FIG. 1. While shown as separate entities in FIG. 1, the networks 116 may include multiple communication networks of one or more types (e.g., one or more wired and/or wireless local area networks (LANs), and/or one or more wired and/or wireless wide area networks (WANs) such as the Internet). Moreover, the networks 116 may use partially or entirely distinct network components to support communications between different endpoints or computing devices, such as wireless communication or data transmission over one or more radio frequency links and/or wireless communication channels. Different types of networks 116 may be used in different systems, depending upon, for example, how the on-premise datacenter 102 and the cloud computing environment 106 are localized or distributed across various networks and geographic areas.

As shown in FIG. 1, the on-premise datacenter 102 may initially connect to a cloud data repository 118 and request a one-time transmission of a set of organization's data records, to be used for generating and training an NLP query. The cloud data repository 118 may transmit the one-time training data pull 120 back to the on-premise datacenter 102. The on-premise data analytics tool 104 may use the received training data to generate an NLP query. During the query generation process, which may be fully automated, semi-automated, or manual, the on-premise data analytics tool 104 may provide a user interface component 122, query generator component 124, and/or validation component 126 to be used for generating and validating an NLP query (or a taxonomy of multiple queries).

After one or more queries have been generated and/or validated using the on-premise data analytics tool 104, the validated queries 128 may be provided to the query transformer component 110 to transform the queries into modified queries that are compatible with the query execution platform 108. As described below in more detail, the query transformer component 110 may use various techniques, including operation mapping, search-and-replace lists, supplemental operations, etc., to transform the validated queries 128 into modified queries that are compatible with the functions supported by the query executor component 112. Once the queries are modified into modified queries compatible with the query execution platform 108, they may be executed by the query executor component 112 (e.g., using native cloud functionality including text tools, NLP tools, Python packages, etc.) on any combination of data within the cloud data repository 118.

In this example, the query transformer component 110 is depicted within the query execution platform 108 in the cloud computing environment 106. In other examples, the query transformer component 110 may be implemented within the on-premise datacenter 102, as a separate tool from the on-premise data-analytics tool 104. Additionally or alternatively, the query transformer component 110 may be implemented in a separate computing system/network accessible to both the on-premise datacenter 102 and the cloud computing environment 106, so that the query transformer component 110 may receive queries and/or queries' results from the on-premise tool 104 (e.g., via a CSV text file) and transmit the modified queries to the query execution platform 108.

As noted above, the techniques described herein provide a number of technical advantages for systems that generate and execute NLP queries and/or data analytics software. For example, the training data pull 120 may be a one-time data transfer from the cloud data repository 118 to the on-premise datacenter 102. In various instances, the one-time training data pull 120 can be a full snapshot of the organization's data at a particular time, or may be a reduced-size subset that is sufficient for generation and training NLP queries. In either instance, because the queries are ultimately executed within the same cloud computing environment 106 where the organization's data resides, there is no need to perform repeated or periodic data transfers between the cloud computing environment 106 and the on-premise datacenter 102, which can be time-consuming and expensive in terms of cloud access and network usage. Thus, these techniques may effectively reduce network bandwidth and access time and data transfers from the cloud computing environment 106.

Further, these techniques may improve the execution time for executing NLP queries and other data analytics. Because the modified queries generated by the query transformer component 110 reside on the same cloud computing environment 106 as the organization's data stores, the modified queries may be executed any number of times within the cloud environment, without needing to transfer data and while leveraging the high-speed native cloud data analytics functions. Nonetheless, these techniques still provide users (e.g., query developers, data analytics engineers) the capabilities to generate and train NLP queries within the more robust and familiar software development environments of the on-premise datacenter 102. In particular, these techniques may allow users to leverage the preferred functionality and features of the on-premise data analytics tool 104, such as the user interface component 122, the validation component 126, and/or a term replacement or additional functionality that might not be available within the query execution platform 108 or native cloud tools of the cloud computing environment 106.

As noted above, the hybrid computing environment 100 in this example may include two (or more) resource domain environments: an on-premise datacenter 102 and a separate cloud computing environment 106. However, in other examples, similar or identical techniques to those described herein, including generating NLP queries using a first data analytics tool in one resource domain environment, and transforming them into modified NLP queries for executing in a separate resource domain environment, can be performed in various different types of hybrid computing environments. For instance, similar techniques may be used to generate NLP queries (or other data analytics software) within a first cloud environment, transform the queries, and execute the modified queries in a second different cloud environment. Similar techniques also may be used to generate NLP queries (or other data analytics software) in a first on-premise datacenter of an organization, transform the queries, and then execute the modified queries in a second different on-premise datacenter of the organization or a different organization.

Figure 2:
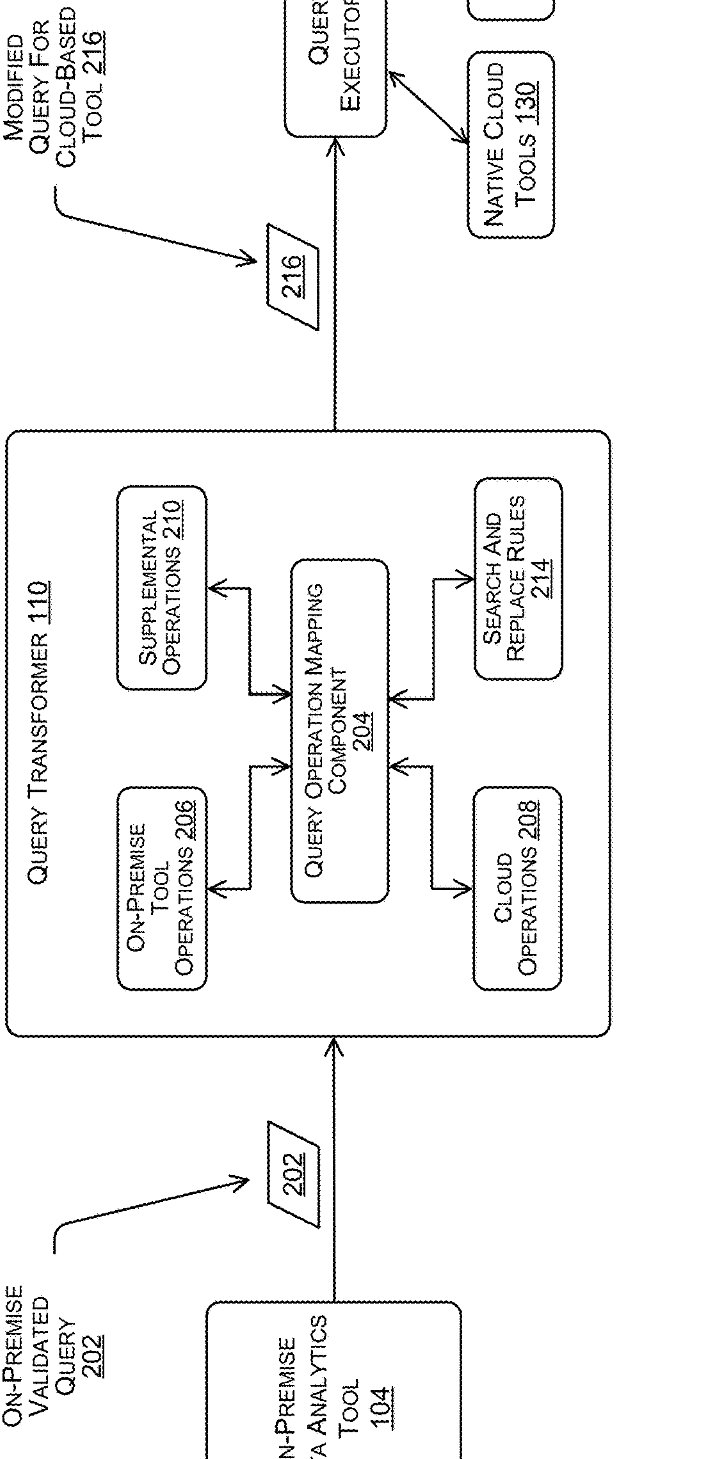
FIG. 2 is a block diagram illustrating an example query transformer system configured to modify queries generated using an on-premise data analytics tools for use in a cloud computing environment, in accordance with one or more examples of the present disclosure.

FIG. 2 depicts an example system 200 including a query transformer component 110 configured to modify queries that have been generated using a first software tool (e.g., an on-premise data analytics tool 104) into modified queries that may be executed using a second software tool (e.g., a query executor component 112) in a different computing environment. The query execution platform 108 also may execute the queries and compare the results to those from the on-premise data analytics tool 104. As noted above, the query transformer component 110 may be implemented within the query execution platform 108 on the cloud computing environment 106, or may be implemented within a separate computing system/infrastructure. In some examples, in computing environments where multiprocessing is available, any or all components of the query transformer component 110 and query executor component 112 may be run inside a multiprocessing class (e.g., a Python class).

As described above, the query transformer component 110 may receive one or more queries (e.g., individually or as a taxonomy (or group) of queries) that have been generated using an on-premise data analytics tool 104. The query transformer component 110 may transform each on-premise validated query 202 into a corresponding modified query 216 that is compatible with the query executor component 112 of the query execution platform 108 executing within a cloud computing environment 106.

To transform a query 202 into a modified query 216, the query transformer component 110 may include a query operation mapping component 204 configured to transform the query 202 into the modified query 216, operation-by-operation and/or line-by-line. For instance, for each particular operation (e.g., function call, text operation, NLP operation, etc.) within the query 202, the query operation mapping component 204 may determine a corresponding operation supported by the query execution platform 108. In some cases, the query operation mapping component 204 may perform function/operation mappings based on listings of on-premise tool operations 206 and corresponding cloud operations 208 supported within the cloud environment. The cloud operations 208 may include, for example, listings of query functions supported by the query executor component 112, and/or functions or other operations supported by additional cloud tools (e.g., NLP and/or text functions provided by native cloud tools 130 and/or packages 132). The query operation mapping component 204 may maintain mappings between each of the on-premise tool operations 206 and corresponding cloud operations 208 (e.g., individually or combinations thereof) as well as supplemental operations 210.

In some instances, an operation mapping may be a one-to-one mapping, in which the query operation mapping component 204 determines, for a particular NLP operation within the query 202, a corresponding operation in the cloud operations 208 that is identical or similar to (e.g., sufficiently approximates the results of) the NLP operation. When a one-to-one operation mapping is possible, the query operation mapping component 204 may perform the mapping by switching the NLP operations in the query 202 for the corresponding cloud operation 208. In addition to simply switching the operation name, the query operation mapping component 204 also may perform various reformatting or modifying of the portion of the query associated with the operation, including reformatting the invocation call, changing the arguments and variables, etc. so that the modified operation may be compatible with the corresponding cloud operation 208.

Operation mappings also may be one-to-many mappings, in which the query operation mapping component 204 determines, for a particular NLP operation within the query 202, a combination of multiple operations within the cloud operations 208. In such cases, the combination of cloud operations 208 may be determined by the operation mapping component 204 as a set of operations that, when executed in sequence, may approximate the output of the NLP operation in the query 202. For instance, a single query function supported by the on-premise data analytics tool 104 may be approximated by performing a sequence of multiple functions supported by the query executor component 112 (including invoking native cloud tools 130 and/or packages 132). In these cases, the query operation mapping component 204 also may perform various query reformatting or modifying steps, as described above. The formatting in these cases can further include defining additional variables in the modified NLP query 216 to receive the output of one operation in the sequence, format or modify the output as needed, and then use the output as an input variable for the next operation in the sequence.

Additionally or alternatively, the query operation mapping component 204 may implement one or more supplemental operations 210, which can include operations that might not be supported natively by the query executor component 112 and/or query execution platform 108, but may be other operations that can be implemented and deployed on the cloud computing environment 106 (e.g., native cloud tools 130 and/or packages 132) to support more robust functionality of the modified queries 216.

Although not shown in this example, the query transformer component 110 may invoke a query evaluation component 114 in some examples, after the generation of the modified queries 216. For example, the query evaluation component 114 may be configured to operate between the query transformer component 110 and the query evaluation component 114 in FIG. 2. The query evaluation component 114 may be configured to perform one or more validations and/or evaluations to assure that the modified query 216 is suitable for execution by the query execution platform 108. In some instances, the query evaluation component 114 may be configured to verify that the structure, syntax, format, operation listings, etc., of the modified query 216 are compatible with the query executor component 112, and thus that the modified query 216 can be successfully executed without errors/failures within the cloud computing environment 106. To perform such operations, the query evaluation component 114 may access the query executor component 112 (and/or native cloud tools 130 and/or packages 132) to confirm that the modified queries 216 they can be executed successfully without errors, crashes, or significant performance issues.

In some cases, the query evaluation component 114 also may be configured to compare the results of the modified query 216 (e.g., the set of data records output by the modified query 216) to the results of the corresponding on-premise validated query 202. For instance, the query evaluation component 114 may receive the results of the execution of the query 202 (e.g., from the on-premise data analytics tool 104) and results of the execution of modified query 216 (e.g., from the query executor component 112) on the same data store to compare the results. As noted above, it may be infeasible in some case for the modified query 216 to exactly mimic the on-premise query 202 (e.g., due to different operation sets, different data parsing techniques, syntax differences, etc.). However, the query evaluation component 114 may verify that the execution results of the modified query 216, based on one or multiple executions on various data sets, are identical or sufficiently similar to (e.g., above a similarity threshold) as compared to the results of the on-premise validated query 202.

In some examples, the query transformer component 110 also may determine and/or generate sets of search and replace rules 214. The search and replace rules 214 may define a set of search and replace operations that can be executed by the query execution platform 108, when executing the modified query 216. In some examples, the query transformer component 110 may determine the search and replace rules 214 based on the output of a term replacement component within the on-premise data analytics tool 104. When generating and/or validating the query 202, a term replacement within the on-premise data analytics tool 104 may be used to detect and correct misspellings (and/or alternative spellings) within the organization's data stores, as well as performing tasks such as expanding abbreviations, removing HTML tags, etc. During validation of the query 202, a query developer may determine which misspellings or alternative spellings should be corrected or ignored, and may use the term replacement component to perform the corrections when executing the NLP query on the organization's data. The output of the term replacement component (e.g., a search-and-replace listing of terms) may be provided to the query transformer component 110, as a separate file or data structure.

Using the term replacement search-and-replace data received from the on-premise data analytics tool 104, the query transformer component 110 may determine a corresponding set of search and replace rules 214 to be used with the modified query 216 when executed by the query execution platform 108. In some cases, the search and replace rules 214 may be applied (e.g., as native text search and text replace operations) during preprocessing operations prior to executing the modified query 216. For instance, when the execution of a modified query is initiated via the query executor component 112 on a set of data within the cloud data repository 118, the query execution platform 108 may apply the search-and-replace rule 214 to the data prior to indexing, dictionary creation, and/or query execution. In some cases, the search and replace rules 214 may be implemented as a separate set of search-and-replace operations that can be executed by the query execution platform 108 on any of the organization's data stores within the cloud computing environment 106. The execution of the search and replace operations, when performed in conjunction with the modified query 216, can correct misspellings within the sets of organization data records and/or can be used to make the data records output by the query more uniform and better suited for downstream processing by other cloud services.

Figure 3:
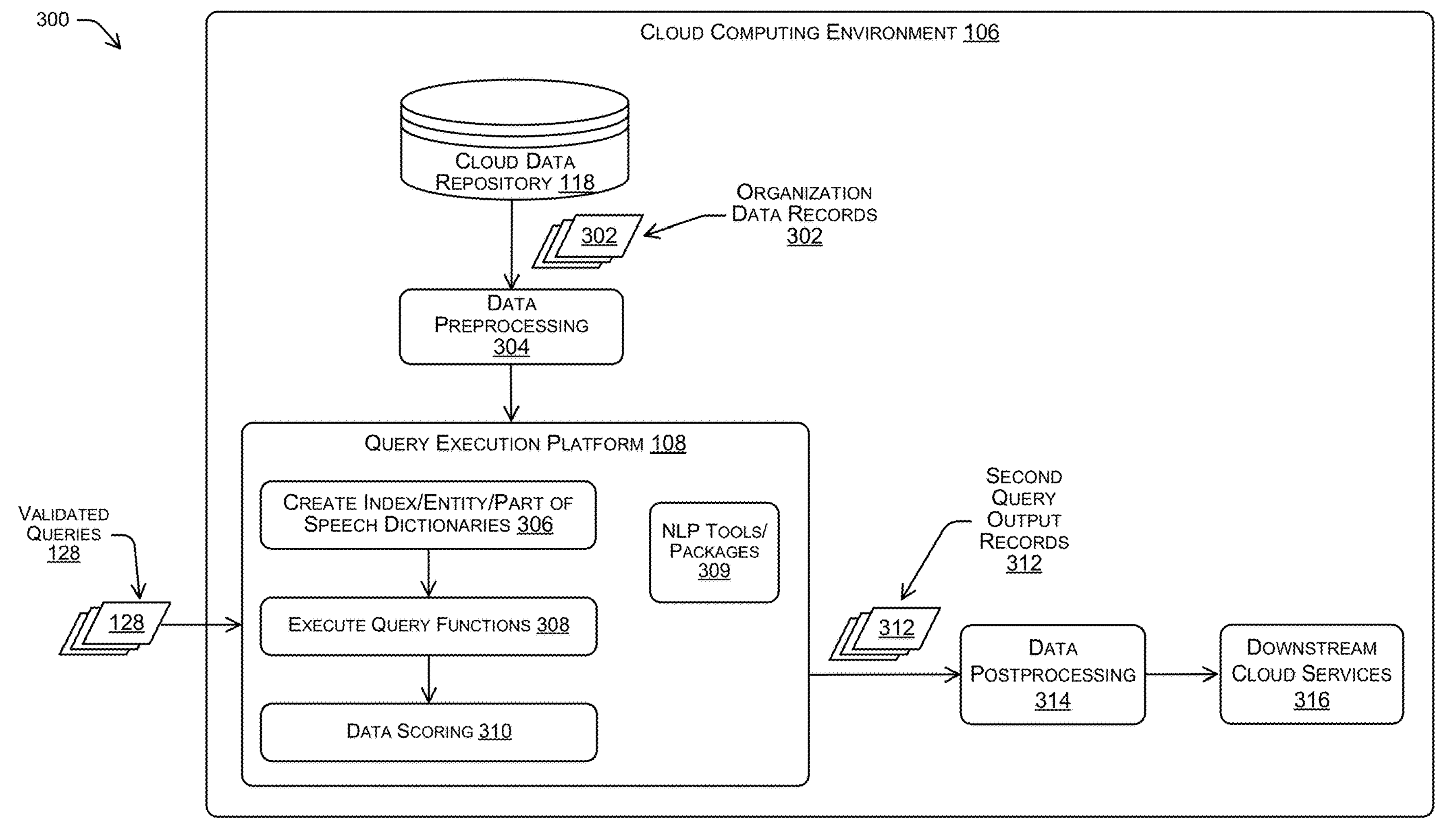
FIG. 3 depicts an example cloud computing environment including a query execution platform configured to execute modified queries to perform data analytics on an organization data repository, in accordance with one or more examples of the present disclosure.

FIG. 3 illustrates an example computing environment 300 that may be used to execute NLP queries and/or perform data analytics tasks for an organization based on the outputs of the NLP queries. As shown in this example, the computing environment 300 may correspond to the cloud computing environment 106 described above. In other examples, the computing environment 300 may include another cloud-based environment, an on-premise datacenter, and/or another system configured to store one or more organization data stores. In this example, the cloud data repository 118 may comprise cloud-based data stores for storing various types of structured or unstructured organizational data (e.g., sales data, personnel data, financial data, transcripts or other records detailing customer interactions, etc.).

As noted above, the computing environment 300 (e.g., cloud computing environment 106) may include one or more data analytics tools (e.g., query execution platform 108). The modified queries generated by the query transformer component 110 may be stored and executed by the query executor component 112 via the query execution platform 108. Because the modified queries 128 have been generated specifically to be compatible with the query executor component 112, these queries can be executed directly within the cloud-based environment 300 on the organization's data.

In this example, the query execution platform 108 may initiate an execution of a modified query by retrieving a set of organization data records 302 from the cloud data repository 118. The organization data records 302 may be preprocessed using one or more data preprocessing components 304. After receiving the preprocessed input data, the query execution platform 108 may receive and execute the validated queries 128. As shown in this example, the query execution platform 108 may include index components 306 configured to generate various dictionaries (e.g., indexes, entity dictionaries, part of speech dictionaries, etc.) based on the input data. For example, the index components 306 may include a language model (e.g., an English spaCy model) to be applied to the text, to parse the text and apply attributes (e.g., lemma, part of speech, dependency, etc.) to each term that is used within the modified query. In some cases, the index components 306 may include entity and/or part-of-speech dictionaries that may be created, for example, when the corresponding functions (e.g., an entity function or part-of-speech function respectively) are used in the query/taxonomy. A static synonym dictionary also may be provided in the index components 306 in some cases, and may be loaded when thesaurus and/or synonym functions are used in the query/taxonomy. To improve speed and efficiency with respect to time and compute resources, certain of these dictionaries (e.g., the entity dictionary, part-of-speech dictionary, and/or static synonym dictionary) in index components 306 might be created and/or loaded only instances when the corresponding functions are used by the query/taxonomy.

To execute the queries, the query execution platform 108 may use a query executor component 112 that implements its own specially-designed set of query functions 308 (e.g., corresponding to the functions/operations of the on-premise data analytics tool 104), and/or any native NLP tools/packages 309 available on the cloud environment. The native NLP tools/packages 309 may include, for example, native cloud tools 130 (e.g., native text tools, native NLP tools, etc.), packages 132 (e.g., Python packages or other libraries), and/or supplemental operations (e.g., supplemental operations 210) to provide support for more robust NLP query functionality within the cloud computing environment 106. Based on the techniques used by the query transformer component 110 to create the modified queries, the output of the modified queries may be similar or identical to the output of the original validated queries 128 generated within the on-premise development environment.

The execution results of the modified queries (e.g., applying the queries to the organization's data records 302) may be scored using a data scoring component 310. As shown in this example, the second query output records 312 (e.g., the scored execution results of the modified queries) also may be postprocessed using a postprocessing component 314. After query execution and/or postprocessing, the queries' results may be provided to one or more downstream cloud services 316, which may be configured to perform various functionality for the organization based on the NLP query results.

As noted above, these techniques may be to perform various data analytics tasks and other functionality on various types of organization data. In some examples, the cloud data repository 118 may include semi-structured or unstructured data representing interactions between customers and agents of the organization (e.g., call transcripts, chat transcripts, customer emails, etc.). In these examples, the validated and modified queries may include various queries to identify different types of customer interactions that match specific criteria (e.g., particular topics, sales opportunities, customer sentiment, complaints, etc.). The results from executing the modified queries then may be forwarded to various downstream cloud services 316, which may provide focused and specific functionality for the organization based on the query results. The downstream cloud services 316 may include various services designed to, for instance, monetize based on retrieved sets of sales opportunities output by an NLP query, respond to a set of retrieved customer complaints or negative interactions output by an NLP query, analyze and score the agent behaviors in the retrieved set interactions output by an NLP query.

In some examples, the techniques described in connection with FIG. 3 may be performed via multi-threading (or other parallel processing techniques). In such examples, the data retrieved from the cloud data repository 118 may be chunked into N chunks. Each data chunk may be processed via a similar identical process flow, during which the data chunk is cleaned, indexed, queried, and scored. The multi-threading processing of data chunks may be done in parallel (e.g., all chunks processed together) and/or sequentially (e.g., when one chunk or set of chunks is completed, the next chunk or set of chunks will start).

FIG. 4 shows an example transformation process 400 for a single example NLP query, in which the NLP query is depicted in multiple different forms. Initially, in box 402 the query is depicted as a natural language (e.g., human-made) request, such as a request received from a business partner. Based on the natural language request, a query developer may formulate a corresponding simple string query, shown in box 404. Additionally or alternatively, the on-premise data analytics tool 104 (or other software platform) may be configured to convert one or both of the natural language request in box 402 and/or the simple string query in box 404, into a validated query capable of being executed by the on-premise data analytics tool 104, shown in box 406. For example, the query in box 402 may correspond to a request from a user (e.g., a business partner) to a query developer, box 404 may represent pseudocode of the request designed by the query developer, box 406 may represent the actual code provided to the on-premise tool by the query developer. Finally, using the techniques described herein, the query transformer component 110 may transform the validated query for the on-premise data analytics tool in box 406, into a corresponding modified query (e.g., having an identical or approximate output) capable of being executed by the query execution platform 108, shown in box 408. In some examples, automated techniques (e.g., heuristics and/or generative artificial intelligence) may be used to generate the pseudocode in box 404, the query code for the on-premise tool 104, and/or the modified query for execution by the query execution platform 108, based on the natural language query request in box 402.

FIG. 5 illustrates an example taxonomy 500 including multiple related queries. As noted above, during the query generation process, a user (e.g., query developer) may use the on-premise data analytics tool 104 to generate multiple related queries associated with different instances/conditions that may be detected within a set of data records. In this example, the cloud data repository 118 may include data stores of interactions between customers and agents of the organization. The customer interactions may take the form of text transcripts of phone calls, video calls, online chat sessions, emails, etc. Within the cloud data repository 118, the NLP query taxonomy shown in FIG. 5 may be designed to detect and distinguish between various types of customer travel complaints. It should be understood that FIG. 5 depicts only one example taxonomy 500, and the cloud data repository 118 is not limited to containing customer-agent interaction records. In other examples, the organization data stored in the cloud data repository 118 (and the corresponding queries/taxonomies used to retrieve and analyze the data) may relate to any other data types, such as organization reports, files, notes, survey responses, and/or other documentation.

In this example, the organization may correspond to a commercial airline and the root node of the taxonomy 500 may represent the set of customer interactions within the cloud data repository that are associated with customer complaints. Within the taxonomy, the root node 502 branches into three category nodes associated with different classes of customer complaints: timeliness complaints at node 504, seating complaints at node 506, and refreshment complaints at node 508. Within each of the complaint class nodes 504-508, the taxonomy defines a number of subcategory nodes. For instance, within the timeliness complaints class node 504, the taxonomy 500 includes a slow boarding subclass node 510, a missed connection subclass node 512, a flight delayed subclass node 514, and a flight canceled subclass node 516. Within the seating class node 506, the taxonomy 500 includes a broken seat subclass node 518, a dirty seat subclass node 520, and an uncomfortable seat subclass node 522. Within the refreshments class node 508, the taxonomy 500 includes a no refreshments subclass node 524, a payment issue subclass node 526, and a food poisoning subclass node 528.

Within the taxonomy 500, for each class/subclass combination 510-528, a corresponding NLP query can be defined to retrieve data records associated with the class/subclass of customer complaints. The queries shown in FIG. 5 may represent queries designed and generated using an on-premise data analytics tool 104, including training/validation based on the one-time training data pull 120, as described above.

Although this example taxonomy 500 includes a relatively small number of classes/subclasses, it can be understood that other query taxonomies may include any number of branches, layers, etc. Further, taxonomies may be designed to identify and retrieve structured and/or unstructured data records relating to any aspect or combination of aspects within the organization's data (e.g., transactions, personnel, products, customer interactions, financial data, etc.).

Although various techniques described herein may be performed on individual NLP queries, there may be additional advantages when applying these techniques to larger taxonomies including any number of NLP queries that may apply to the same cloud data repository. For instance, the organization may design and deploy their cloud-based infrastructure so that different classes/subclasses of data records are handled differently, including routing different output result sets from the different queries 510-528 to different downstream cloud services 316.

Figure 6:
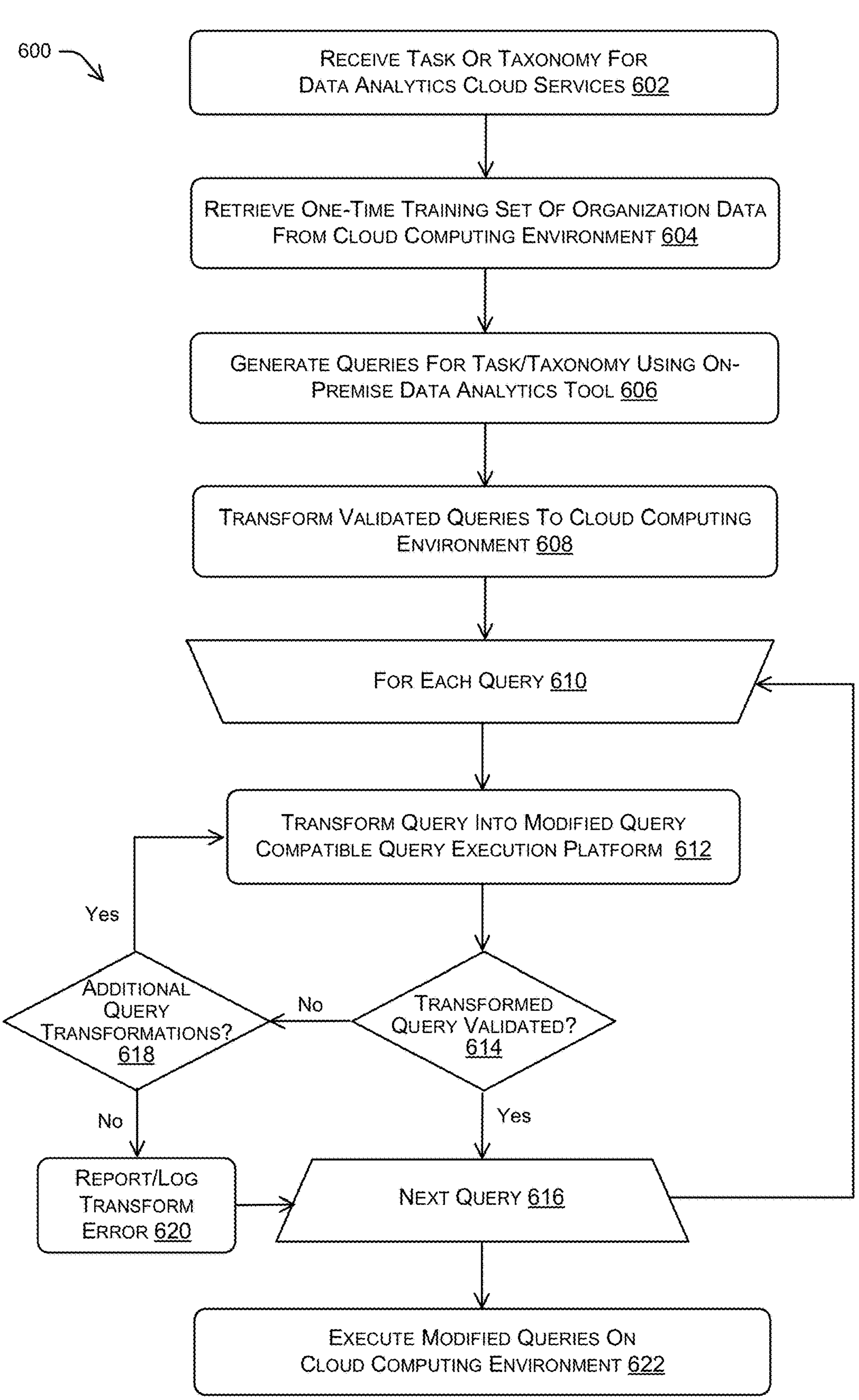
FIG. 6 depicts an example process of transforming a taxonomy of queries generated using an on-premise data analytic tool into modified queries for use by a query execution platform within a cloud environment, in accordance with one or more examples of the present disclosure

FIG. 6 is a flow diagram illustrating an example process 600 of transforming a taxonomy of queries generated using an on-premise data analytic tool, into modified queries for use by a query execution platform within a cloud-based environment. As described herein, various operations in process 600 may be performed by components within an on-premise datacenter 102, the query execution platform 108, and/or other components within a cloud computing environment 106, including or in combination with any of the various components described above in FIGS. 1-5. As noted above, the query transformer component 110 may be implemented within a Python platform (e.g., the query execution platform 108) or elsewhere within a cloud computing environment 106, or may be implemented within an on-premise datacenter 102 and/or within a separate system external to both the on-premise datacenter 102 and the cloud computing environment 106.

At operation 602, the on-premise datacenter 102 (e.g., one or more processors within the on-premise datacenter 102, using non-transitory computer-readable media containing computer-readable instructions) may receive a task and/or a taxonomy associated with various data analytics that may be performed on an organization's data records. In some examples, a task may take the form of a natural language request (e.g., box 402) or a simple string query (e.g., box 404) that may be received from a user associated with the organization. A taxonomy (e.g., taxonomy 500) may include multiple tasks (e.g., related requests and/or data classifications) from which queries can be generated. In various examples, the task and/or taxonomy received in operation 602 may be received via an on-premise data analytics tool 104, the query transformer component 110, or other components within the on-premise infrastructure.

At operation 604, the on-premise datacenter 102 may retrieve a one-time training set of organization data, to be used for generating and training queries based on the requests received in operation 602. For instance, the data retrieval may correspond to the one-time training data pull 120 from a cloud data repository 118, containing a relevant set of training data for generating and training queries within the on-premise environment. The retrieved data may include a snapshot of organization's data at a particular time, or may include any subset of the organization's data that can be used for training purposes. In various examples, the retrieval of the training data may be initiated via the on-premise data analytics tool 104, the query transformer component 110, or other components within the on-premise infrastructure.

At operation 606, the on-premise datacenter 102 may generate and/or train one or more NLP queries based on the tasks/taxonomies received in operation 602. In some examples, the generation and training of NLP queries in operation 606 (which may be referred to as original queries) can be performed via the on-premise data analytics tool 104. In other examples, various other software platforms and/or development environments may be used to generate queries that are suitable for execution via the on-premise data analytics tool 104. However, as noted above, the use of the on-premise data analytics tool 104 to generate and train queries may provide a number of advantages, including the familiar development environment for users and the additional features and functionality supported by the on-premise data analytics tool 104. Examples of the on-premise data analytics tool 104 may include, but are not limited to PolyAnalyst® by Megaputer Intelligence, Base SAS®, Anaconda Enterprise®, or Watson Studio® by IBM, etc.

At operation 608, after generating and validating one or more queries or taxonomies via the on-premise data analytics tool 104, the validated queries may be transmitted to the cloud computing environment 106, for transformation, execution and/or evaluation by the query execution platform 108.

Between operation 610 and operation 616, the query transformer component 110 may transform each of the validated queries received from the on-premise data analytics tool 104, into a modified query compatible with the query executor component 112. For example, at operation 612, the query transformer component 110 may use operation mapping and various related techniques described herein to transform the original query operations into different operations (when needed) supported by the query execution platform 108.

At operation 614, the query transformer component 110 (and/or the query evaluation component 114) may perform one or more validations to verify that the modified query performs similarly when executed (e.g., returns similar or identical output records) as the original query generated using the on-premise data analytics tool 104. Although validation may be optional and need not be performed in some cases, in other cases one or more types of validation processes may be applied in operation 614. For instance, the query evaluation component 114 may be used to verify that the structure, syntax, format, operation listings, etc., of the modified query are compatible with the query executor component 112. Additionally or alternatively, the query evaluation component 114 may be configured to compare the results of the modified query (e.g., the set of data records output by the modified query) to the results of the on-premise validated query when executed against the same data store.

In this example, when the modified query is successfully validated (614: Yes), process 600 may proceed to operation 616 to iterate the query transformation process over any additional queries within the taxonomy. In contrast, when the query cannot be validated (614: No), process 600 may proceed to operation 618, where the query transformer component 110 may be configured to determine and output one or more possible responses to the validation failure. In some instances, the query transformer component 110 may be configured to respond to query validation failures by performing a different alternative query transformation (618: Yes), in which different sets of operation mappings, variable mappings, formatting changes, search and replace rules, etc., are applied. For instance, when the query transformer component 110 transforms a query into a modified query, it may be configured to use a preferred order of operation mapping rules (e.g., in which a first operation is preferably mapped to a second operation, etc.). However, in this example, when the query cannot be validated (614: No), the query transformer component 110 may be configured to use alternative mappings of operations (e.g., in which the first operation is alternatively mapped to a third operation, etc.). Additionally or alternatively, the query transformer component 110 may be configured to respond to query validation failures by reporting/logging errors (618: No) to allow users (e.g., query developers) to regenerate and/or manually transform the original query.

At operation 622, after the query or taxonomy of queries has been transformed into modified queries, the query transformer component 110 may provide the modified queries to the query executor component 112 within the query execution platform 108. As noted above, because the modified queries may be executed within the same cloud computing environment 106 where the organization's data resides, the query execution platform 108 can be configured to execute the queries repeatedly or periodically, using the query executor component 112, as new data is received and stored within cloud data repositories of the organization, and without needing to perform data transfers between the cloud computing environment 106 and the on-premise datacenter 102.

Figure 7:
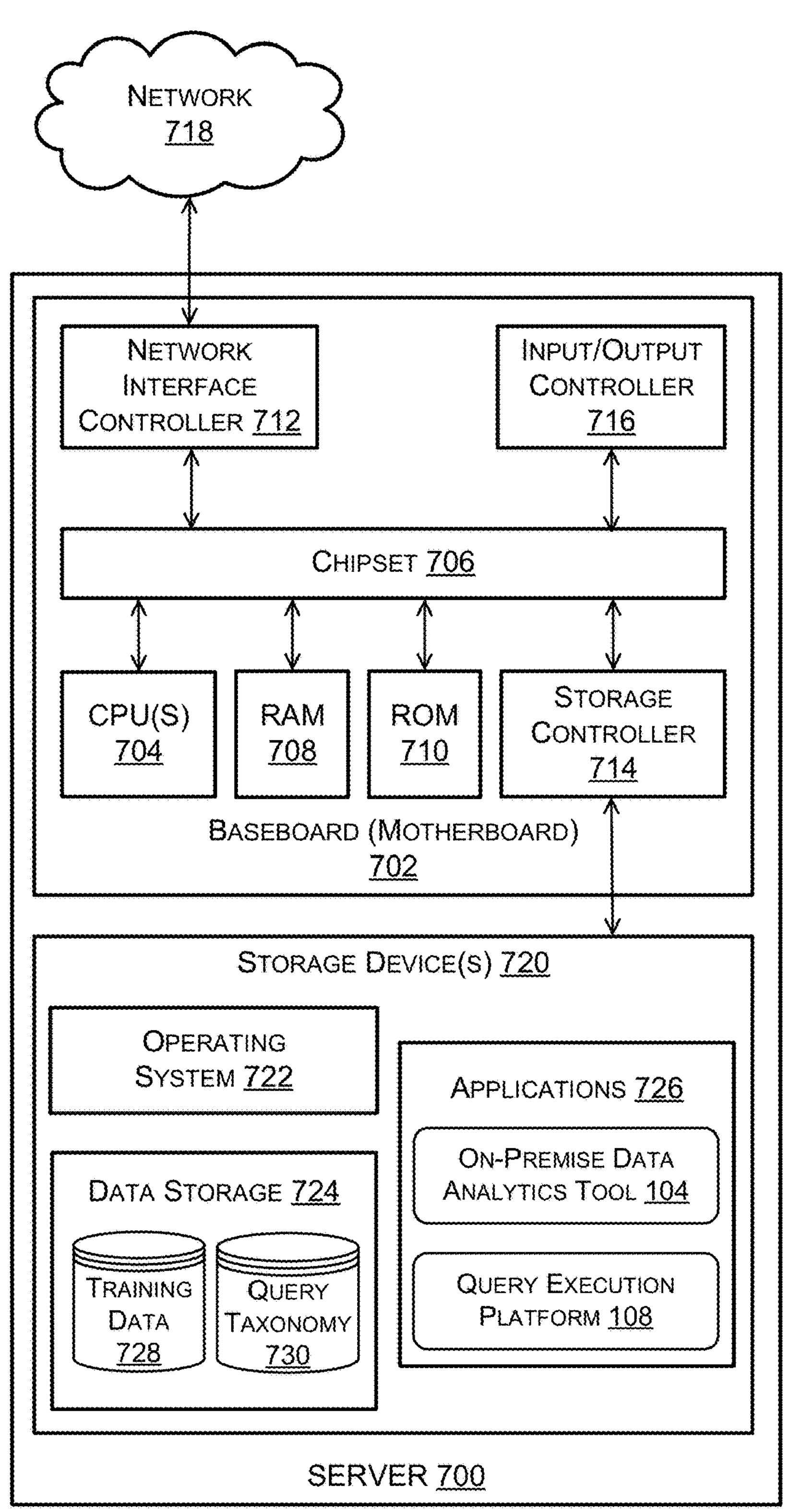
FIG. 7 is an example architecture of a computer server capable of executing program components for implementing various techniques described herein.

FIG. 7 shows an example architecture of a computer server 700 capable of executing program components for implementing the various functionality described herein. Although the computer architecture in this example is labeled as a server, it can be understood from this disclosure that similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 700 may, in some examples, correspond to any of the computing systems or devices described above. For example, in some instances the server 700 may be a computing system operating an on-premise data analytics tool 104. In other instances, the server 700 may be a computing system operating a query execution platform 108 (e.g., including a query transformer component 110, query executor component 112, query evaluator component 114) and/or any other computing devices, systems, or components executing the software components described herein. It will be appreciated that in various examples described herein, a server 700 might not include all of the components shown in FIG. 7, may include additional components that are not explicitly shown in FIG. 7, and/or may utilize a different architecture from that shown in FIG. 7.

The server 700 includes a baseboard 702, or "motherboard," which may be a printed circuit board to which a multitude of components or devices are connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server 700. Additionally or alternatively, any or all of the CPUs 704 of the server 700 may include graphics processing units (GPUs).

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server 700. The chipset 706 can further provide an interface to a computer-readable storage medium such as a ROM 710 or non-volatile RAM ("NVRAM") for storing basic routines that help to startup the server 700 and to transfer information between the various components and devices. The ROM 710 or NVRAM can also store other software components necessary for the operation of the server 700 in accordance with the configurations described herein.

The server 700 can operate in a networked environment using logical connections to remote computing devices and computer systems through a network, such as the network 718, which may be similar or identical to any of the communication networks discussed above. The chipset 706 also may include functionality for providing network connectivity through a Network Interface Controller (NIC) 712, such as a gigabit Ethernet adapter. The NIC 712 is capable of connecting the server 700 to other computing devices (e.g., query transformer component 110, on-premise datacenters, cloud service providers, etc.) over the network 718. It should be appreciated that multiple NICs 712 can be present in the server 700, connecting the computer to other types of networks and remote computer systems. In some instances, the NICs 712 may include at least on ingress port and/or at least one egress port.

The server 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device.

The server 700 can include one or more storage device(s) 720, which may be connected to and/or integrated within the server 700, that provide non-volatile storage for the server 700. The storage device(s) 720 can store an operating system 722, data storage systems 724, and/or applications 726, which are described in more detail herein. The storage device(s) 720 can be connected to the server 700 through a storage controller 714 connected to the chipset 706. The storage device(s) 720 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 700 can store data on the storage device(s) 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 720 are characterized as primary or secondary storage, and the like.

For example, the server 700 can store information to the storage device(s) 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 700 can further read information from the storage device(s) 720 by detecting the physical states or characteristics of one or more particular locations within the physical storage units.

In addition to the storage device(s) 720 described above, the server 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 700. In some examples, the various operations performed by the computing systems described herein (e.g., on-premise data analytics tool 104, query execution platform 108, query transformer component 110, etc.) may be implemented within a datacenter and/or cloud computing environment including one or more servers or devices similar to server 700. For instance, some or all of the operations described herein may be performed by one or more server 700 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 720 can store an operating system 722 utilized to control the operation of the server 700. In some examples, the operating system 722 comprises a LINUX operating system. In other examples, the operating system 722 comprises a WINDOWS® SERVER operating system from MICROSOFT Corporation of Redmond, Washington. In further examples, the operating system 722 can comprise a UNIX operating system or one of its variants. It should be appreciated that other operating systems can also be utilized. The storage device(s) 720 can store other system or application programs and data utilized by the server 700.

In various examples, the storage device(s) 720 or other computer-readable storage media is encoded with computer-executable instructions which, when loaded into the server 700, transform the computer from a general-purpose computing system into a special-purpose computer capable of implementing various techniques described herein. These computer-executable instructions transform the server 700 by specifying how the CPUs 704 transition between states, as described above. In some examples, the server 700 may have access to computer-readable storage media storing computer-executable instructions which, when executed by the server 700, perform the various techniques described herein. The server 700 can also include computer-readable storage media having instructions stored thereupon for performing any of the other computer-implemented operations described herein.

As illustrated in FIG. 7, the storage device(s) 720 may store one or more data storage systems 724 configured to store data structures and other data objects. For example, when the server 700 corresponds to a query transformer component 110, and the data storage systems 724 may include one or more data stores, including a training data store 728 (which may correspond to the one-time training data pull 120) and a query taxonomy 730. Additionally, the software applications 726 stored on the server 700 may include one or more client applications, services, and/or other software components. For example, application(s) 726 may include any combination of the components of the on-premise data analytics tool 104, the query execution platform 108, and/or query transformer component 110 in various implementations and/or any other software components described above in reference to FIGS. 1-6.

As illustrated by the above examples, the techniques described herein provide technical advantages for performing data analytics operations on data within cloud-based data stores; using native data analytics tools in a cloud computing environment may support a reduced or limited set of operations as compared with the more robust on-premise data analytics tools. In particular, the techniques described herein may provide improvements in performance and usability of data analytics, in contrast to solutions where NLP queries and/or taxonomies are generated and trained using the native cloud-based data analytics tools within the cloud computing environment. Additionally, in contrast to systems that require repeated transfers of data from the cloud data storage to execute NLP or text analytics queries, the techniques herein may allow the modified queries to be executed within the cloud-based environment any number of times, without requiring additional data transfers and additional cloud access operations.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system, comprising:

one or more processors; and one or more non-transitory computer-readable media storing computer-executable instructions that, when executed by the one or more processors, cause the one or more processors to perform operations comprising:

receiving, by a first computer system in an on-premise computing infrastructure of an organization, a first data set comprising a first plurality of text data records;

executing a first query, using a first data analytics software tool executing on the first computer system, wherein executing the first query comprises applying a first listing of term replacements to the first data set, using a first set of replacement operations supported by the first data analytics software tool;

validating the first query, based at least in part on the execution of the first query;

transforming the first query into a second query associated with a second data analytics software tool, wherein transforming the first query comprises transforming the first listing of term replacements into a second listing of term replacements, based at least in part on the first set of replacement operations and a second set of replacement operations supported by the second data analytics software tool;

accessing a data store associated with the organization, wherein the data store is stored in a cloud computing environment separate from the on-premise computing infrastructure, the data store comprising a second plurality of text data records;

executing the second query, using the second data analytics software tool executing in the cloud computing environment, wherein executing the second query comprises applying the second listing of term replacements to the data store, using the second set of replacement operations; and determining a set of query output records associated with the organization, based at least in part on the execution of the second query.

2. The system of claim 1, wherein the first data analytics software tool executing on the first computer system supports a first set of query operations, and wherein at least one of the first set of query operations is not supported by the second data analytics software tool executing in the cloud computing environment.

3. The system of claim 1, wherein validating the first query comprises:

rendering the first query via a user interface provided by the first data analytics software tool; and invoking a term replacement feature of the first data analytics software tool on the first query, wherein the second data analytics software tool executing in the cloud computing environment does not render a user interface and does not include a term replacement feature.

4. The system of claim 3, the operations further comprising:

validating the first listing of term replacements, using the term replacement feature of the first data analytics software tool; and transmitting the second listing of term replacements to the cloud computing environment.

5. The system of claim 1, wherein validating the first query comprises receiving a validation confirmation from a user, via a user interface provided by the first data analytics software tool, and wherein transforming the first query into the second query is triggered automatically based at least in part on received validation confirmation.

6. The system of claim 1, wherein receiving the first data set comprises:

retrieving, from the cloud computing environment, a first snapshot of the data store associated with the organization at a first time, and wherein executing the second query comprises applying the second query to a second snapshot of the data store associated with the organization at a second time after the first time.

7. The system of claim 1, wherein transforming the first query into the second query comprises:

determining, within the first query, a first operator supported by the first data analytics software tool;

determining that the first operator is not supported by the second data analytics software tool; and converting the first operator to a second operator supported by the second data analytics software tool.

8. The system of claim 1, the operations further comprising:

receiving, at the first computer system, a data taxonomy comprising a plurality of queries, including the first query, wherein each of the plurality of queries is compatible with the first data analytics software tool; and transforming the plurality of queries into a plurality of transformed queries, including the second query, wherein each of the plurality of queries is compatible with the second data analytics software tool.

9. The system of claim 1, the operations further comprising:

comparing a first output of the first query, to a second output of the second query; and determining an accuracy score associated with the transformation of the first query into the second query, based at least in part on the comparing of the first output to the second output.

10. A method comprising:

receiving a first query compatible with a first data analytics software tool installed in a datacenter associated with an organization, the first query comprising a first listing of term replacements performed by a first set of replacement operations supported by the first data analytics software tool;

transforming the first query into a second query associated with a second data analytics software tool, wherein transforming the first query comprises transforming the first listing of term replacements into a second listing of term replacements, based at least in part on the first set of replacement operations and a second set of replacement operations supported by the second data analytics software tool;

executing the second query, in a cloud computing environment separate from the datacenter, using the second data analytics software tool, wherein executing the second query comprises applying the second listing of term replacements, using the second set of replacement operations, to a data store associated with the organization and stored within the cloud computing environment; and determining a set of query output records associated with the organization, based at least in part on the execution of the second query.

11. The method of claim 10, wherein the first data analytics software tool is configured to support a first set of query operations, and wherein at least one of the first set of query operations is not supported by the second data analytics software tool executing in the cloud computing environment.

12. The method of claim 10, further comprising:

rendering the first query via a user interface provided by the first data analytics software tool; and invoking a term replacement feature of the first data analytics software tool on the first query, wherein the second data analytics software tool executing in the cloud computing environment does not render a user interface and does not include a term replacement feature.

13. The method of claim 12, further comprising:

validating the first listing of term replacements, using the term replacement feature of the first data analytics software tool; and transmitting the second listing of term replacements to the cloud computing environment.

14. The method of claim 10, further comprising:

validating the first query, wherein the validating comprises receiving a validation confirmation from a user, via a user interface provided by the first data analytics software tool, and wherein transforming the first query into the second query is triggered automatically based at least in part on received validation confirmation.

15. The method of claim 10, further comprising:

retrieving, from the cloud computing environment, a first snapshot of the data store associated with the organization at a first time, and wherein executing the second query comprises applying the second query to a second snapshot of the data store associated with the organization at a second time after the first time.

16. One or more non-transitory computer-readable media storing instructions executable by a processor, wherein the instructions, when executed by the processor, cause the processor to perform operations comprising:

receiving a first query compatible with a first data analytics software tool executing within an on-premise computing infrastructure of an organization;

receiving a first data set comprising a first plurality of text data records associated with the organization;

executing the first query, using the first data analytics software tool, wherein executing the first query comprises applying a first listing of term replacements to the first data set, using a first set of replacement operations supported by the first data analytics software tool, and outputting a first result;

transforming, based at least in part on the first result, the first query into a second query associated with a second data analytics software tool, wherein transforming the first query comprises transforming the first listing of term replacements into a second listing of term replacements, based at least in part on the first set of replacement operations and a second set of replacement operations supported by the second data analytics software tool;

executing the second query, in a cloud computing environment separate from the on-premise computing infrastructure, using the second data analytics software tool, wherein executing the second listing of term replacements, using the second set of replacement operations, comprises applying the second query to a data store associated with the organization and stored within the cloud computing environment; and determining a set of query output records associated with the organization, based at least in part on the execution of the second query.

17. The one or more non-transitory computer-readable media of claim 16, wherein receiving the first data set comprises:

retrieving, from the cloud computing environment, a first snapshot of the data store associated with the organization at a first time, and wherein executing the second query comprises applying the second query to a second snapshot of the data store associated with the organization at a second time after the first time.

18. The one or more non-transitory computer-readable media of claim 16, wherein transforming the first query into the second query comprises:

determining, within the first query, a first operator supported by the first data analytics software tool;

determining that the first operator is not supported by the second data analytics software tool; and converting the first operator to a second operator supported by the second data analytics software tool.

19. The one or more non-transitory computer-readable media of claim 16, the operations further comprising:

receiving a data taxonomy comprising a plurality of queries, including the first query, wherein each of the plurality of queries is compatible with the first data analytics software tool; and transforming the plurality of queries into a plurality of transformed queries, including the second query, wherein each of the plurality of queries is compatible with the second data analytics software tool.

20. The one or more non-transitory computer-readable media of claim 16, the operations further comprising:

comparing a first output of the first query, to a second output of the second query; and determining an accuracy score associated with the transformation of the first query into the second query, based at least in part on the comparing of the first output to the second output.

* * * * *